April 9, 1963 W. G. FEIK 3,084,472
WATER CIRCULATING DEVICE
Filed April 24, 1958 2 Sheets-Sheet 1
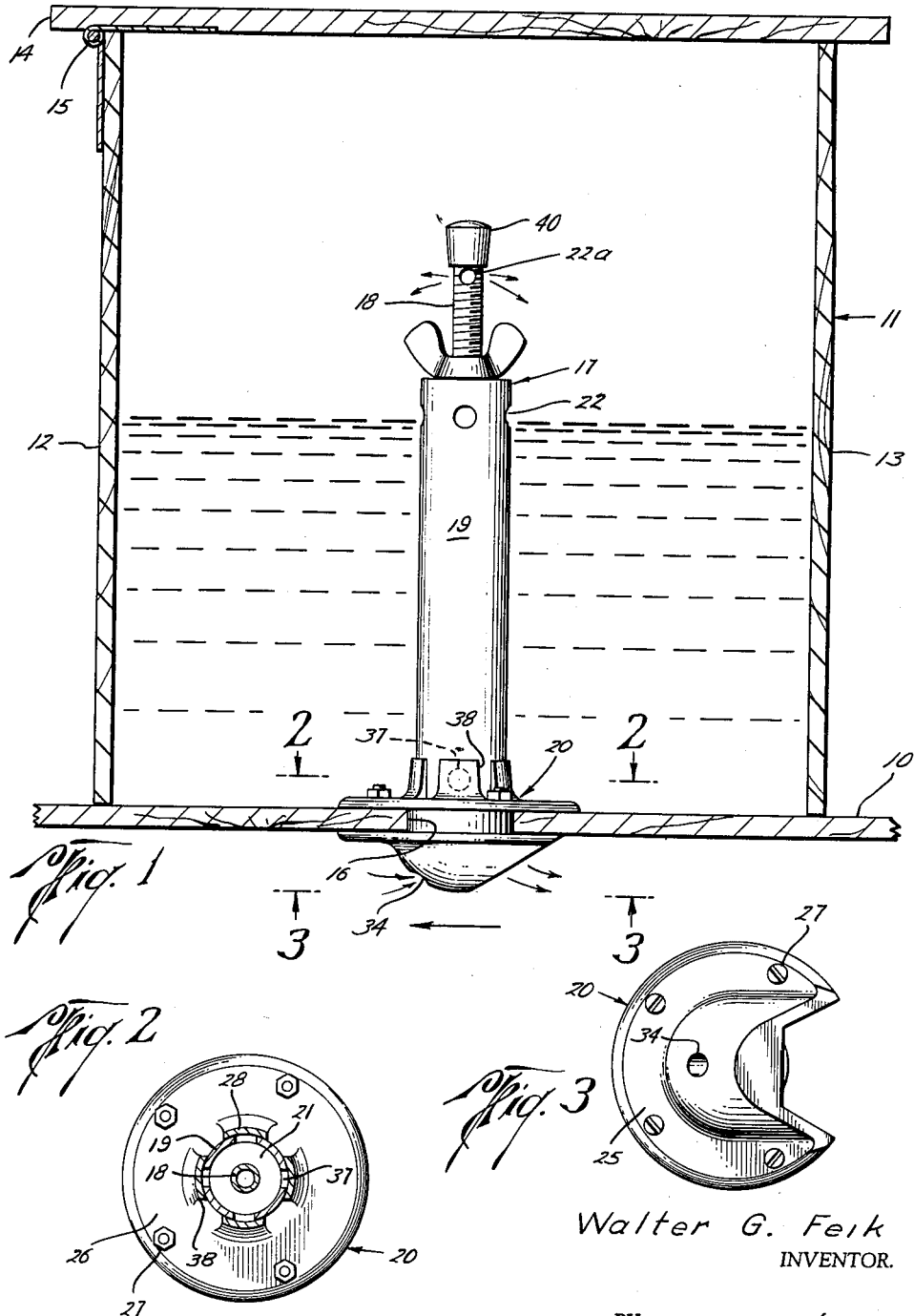
Walter G. Feik
INVENTOR.
BY
Browning, Simms, Hyer
& Eickenroht
ATTORNEYS April 9, 1963 W. G. FEIK 3,084,472
WATER CIRCULATING DEVICE
Filed April 24, 1958 2 Sheets-Sheet 2
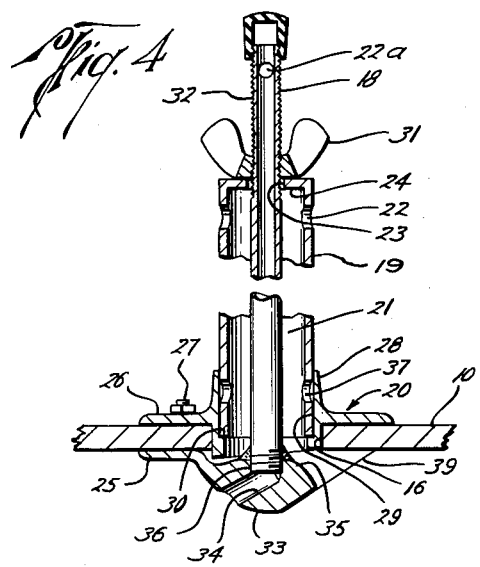
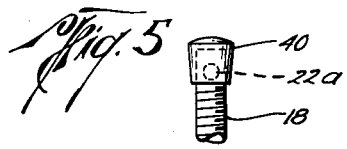
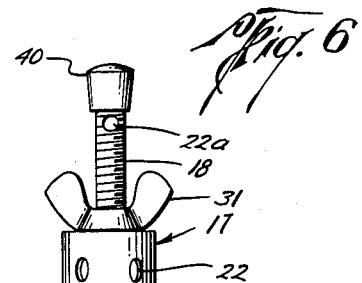
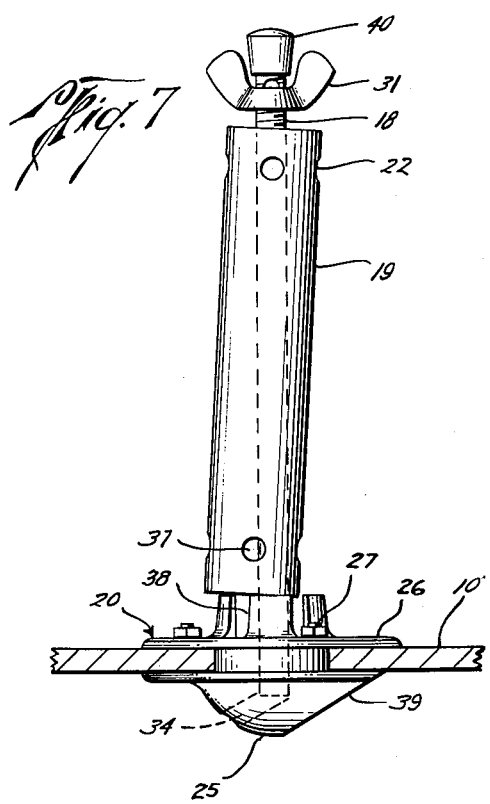
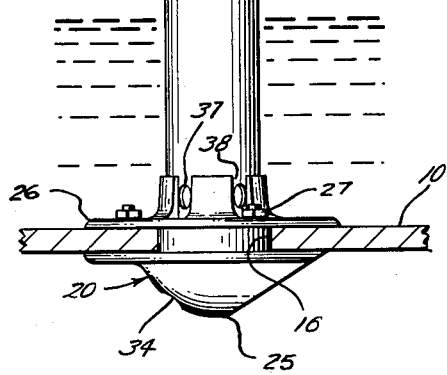
Walter G. Feik
INVENTOR.
BY
Browning, Simms, Hyer
& Eickenroht
ATTORNEYS

United States Patent Office 3,084,472
Patented Apr. 9, 1963

3,084,472
WATER CIRCULATING DEVICE
Walter G. Feik, 10714 Old Coach Lane, Houston, Tex.
Filed Apr. 24, 1958, Ser. No. 730,563
8 Claims. (Cl. 43—55)

This invention relates to a device for use in circulating water through a bait well of the type comprising an enclosure formed in the bottom of a boat and adapted to fill with water through one or more holes in the boat hull.

An object of this invention is to provide a device of this type which is attachable to the boat hull for operation automatically in response to forward movement of the boat in the water.

Another object is to provide a device of the type above described which is compact in construction and which may be attached to the boat hull with a minimum of alterations thereto.

A further object is to provide such a device which permits the water to be drained from the bait well by a simple manipulation of one of its parts.

Still another object is to provide such a device which may be quickly and easily adapted for "still" fishing.

A still further object is to provide such a device in which the rate of water flow into the bait well may be controlled.

These and other objects are accomplished, in accordance with the present invention, by a device which comprises an outer tube having an opening into its upper end, and an inner tube extending longitudinally within the outer tube to provide a space therebetween and having an opening from its upper end exteriorly of the space. Means on the lower end of the tubes provide a lateral inlet to the inner tube and an outlet from the space between the inner and outer tubes. Additional means are provided for fixedly attaching the tubes and inlet and outlet providing means to the boat hull with the tubes extending substantially upright within the bait well and the inlet facing forwardly of the boat beneath the hull.

Thus, when the boat is moved forwardly, water entering the inlet is forced upwardly through the inner tube and out the opening from the upper end of such tube into the bait well. When this water within the bait well reaches the level of the opening into the upper end of the outer tube, it flows downwardly through the space between the inner and outer tubes and is discharged from the outlet into the water beneath the boat hull. This circulation through the bait well not only agitates the water therein, but also keeps it fresh.

In accordance with another novel concept of the present invention, there is an opening in the lower end of the outer tube, and means are provided for covering and uncovering the opening. Such an arrangement permits water to be drained from the bait well when the boat is out of the water. Of course, when the boat is stationary in the water, as during "still" fishing, the level of water in the bait well will fall to that on the outside of the boat. This arrangement is also useful in such a situation as the normal rocking of the boat will cause water to flow through the uncovered opening for agitating the water in the bait well.

In accordance with a preferred form of the invention, the inlet and outlet are formed in a fitting which mounts the inner and outer tubes in the manner above described. Also, the lower end of the outer tube and a portion of the fitting are telescopically and slidably arranged for rotation relative to one another, and the fitting portion is provided with an opening adapted to be aligned and disaligned with the port in the outer tube upon relative rotation therebetween. More particularly, the fitting is provided with means for securing it to the boat hull, and the lower end of the outer tube is movable longitudinally as well as rotatably within the fitting portion to permit it to be removed therefrom. When the lower end of the fitting is so removed, it further facilitates agitation of the water within the bait well when the boat is stationary and also enables the interior of the fitting to be cleaned out, if desired.

The opening from the upper end of the inner tube comprises a lateral port therein, and a closure is disposable over and movable longitudinally of the upper end of such tube for controlling flow through the lateral port therein when conditions warrant.

In the drawings, wherein like reference characters are used throughout to designate like parts:

FIG. 1 is an elevational view of a device constructed in accordance with the present invention and disposed within a bait well for circulating water therethrough upon movement of the boat from right to left, as indicated by the large arrow;

FIG. 2 is a cross-sectional view of the device of FIG. 1, taken substantially along broken line 2—2 thereof;

FIG. 3 is a bottom view of the device, as seen along broken line 3—3 thereof;

FIG. 4 is a longitudinal sectional view of the device, as it is shown in FIG. 1;

FIG. 5 is a detailed view of the upper end of the inner tube thereof, with a cap disposed over the opening therefrom to shut off flow therethrough;

FIG. 6 is an elevational view of the device similar to FIG. 1, but in which the outer tube thereof has been rotated to a position for draining the bait well; and FIG. 7 is another view similar to FIG. 1, but in which the outer tube has been removed from the fitting.

Referring now in detail to the above-described drawings, there is shown in FIG. 1 a portion of a boat including a hull 10 and a bait well 11 including side walls 12 and 13 extending laterally of the boat to form an enclosure with the sides of the boat or other walls extending lengthwise thereof. Conventionally, the upper end of the bait well is closed by a cover 14 hinged as at 15 to permit it to be swung to a position providing access to the interior of the bait well. It is also conventional to provide one or more openings 16 in the boat hull beneath the bait well to permit the well to fill with water which, except for the device of the present invention, would seek a level corresponding to that outside of the boat, as shown in FIG. 6, for example.

The device of the present invention, which is indicated in its entirety by reference character 17, includes an inner tube 18, an outer tube 19, and a fitting 20 on the lower ends of the tubes mounting the inner tube concentrically within the outer tube to provide an annular space 21 therebetween, as best shown in FIGS. 2 and 4. The outer tube 19 has a plurality of lateral ports 22 in its upper end, and the inner tube 18 has one or more lateral ports 22a in its upper end which are exterior of the space 21. More particularly, the upper end of the inner tube extends through an opening 23 in the top wall 24 of the outer tube (see FIG. 4) so that ports 22a are disposed above ports 22. Since the ports 22 are formed in the side of the upper end of outer tube 19, water flowing through ports 22a will collect in the well about the outer tube before flowing into the space 21.

Referring more particularly to FIG. 4, the fitting 20 comprises a lower part 25 and an upper part 26 having oppositely facing flanges which are adapted to bear against the opposite sides of the boat hull for bolting at 27 to one another and said hull. The upper part 26 of the fitting includes a cylindrical portion 28 having an outer diameter which fits closely within the opening 16 through the boat hull, and an inner diameter which defines a central opening 29 therethrough. As also shown in FIG. 4, the lower end of outer tube 19 is telescopically and slidably arranged within the central opening 29 for rotation as well as movement longitudinally of the fitting.

The tube 19 is normally fixed against longitudinal movement by the abutment of its lower end with an upwardly facing annular shoulder 30 formed on the central opening 29, and a wing nut 31 received about a threaded portion 32 on the upper end of the inner tube 18 for bearing engagement with the top wall 24 of the outer tube. Thus, the wing nut may be tightened down upon the outer tube to an extent which permits such tube to be rotated manually. On the other hand, the wing nut may be backed off an amount sufficient to permit the lower end of the outer tube 19 to be removed from the fitting, as shown in FIG. 7.

As shown in FIG. 4, the lower part 25 of the fitting 20 includes a body 33 extending below the boat hull and having a lateral inlet 34 formed in one side and an outlet 35 formed in the other side thereof. The lower end of the inner tube 18 is threadably received in the body at 36 for connection with the inlet 34, and the outlet 35 connects with the lower end of the space 21 between the inner and outer tubes. Thus, the forward motion of the boat will force water into the inlet 34 and up through the inner tube 18 so that it will be discharged into the bait well through ports 22a, as indicated by the arrows in FIG. 1. Then, when the water within the bait well reaches the level of the ports 22 in the outer tube, it will spill into the space 21 and travel downwardly and through the outlet 35 outwardly of the device into the water beneath the boat hull. It will be understood that a certain amount of suction will be created within the outlet 35 so as to facilitate discharge of the water from the bait well. Also, the body 33 forms a barrier against the flow of water upwardly into the space 21.

The lower end of the outer tube 19 is provided with lateral ports 37 therein, and the cylindrical portion 28 of the upper part of the fitting is notched at several locations 38 on substantially the same level as the ports 37 when the outer tube is telescopically received therein. Thus, the outer tube 19 may be rotated from the position of FIG. 1, in which the ports 37 are covered by the cylindrical portion 28 intermediate the notches, to the position of FIG. 6, in which such notches are aligned with the ports to uncover them.

In this latter position, the ports 37 permit the water to be drained from the bait well when the boat is removed from the water. These ports are also useful during "still" fishing as they will provide a flow path between the water beneath the boat hull and in the well such that the water in the well is agitated during normal rocking of the boat. For this latter purpose, the rear end of the lower part 25 of the fitting 20 is tapered, as at 39, so that the outlet faces substantially downwardly to facilitate ingress and egress of the water with respect to the well.

Agitation of the water within the bait well during "still" fishing is further facilitated by removal of the outer tube to the position shown in FIG. 7. Thus, as previously described, the wing nut 31 may be backed off to permit sliding of the lower end of outer tube 19 out of the cylindrical portion 28 of the upper part 26 of the fitting. The lower end of the outer tube, when removed, may be swung to one side and supported on the upper edge of the cylindrical portion 28, as also shown in FIG. 7. Not only does this provide a still larger flow path between the well and boat hull, but also it enables the outlet 35 to be cleaned of bait or debris which may be clogged therein.

A cap 40 of rubber or other suitable material is adapted to be disposed over the upper end of the inner tube 18 for controlling flow through the ports 22a. As can be seen from FIG. 4, this cap is of such size that, in its upper position, it is disposed above the ports 22a to permit maximum flow from the inner tube into the bait well and, in a lowered position, to fully close the ports 37 when it is desired to prevent circulation through and/or filling of the bait well. Intermediate such positions, the cap is useful in restricting the ports for adjusting filling of the well in accordance with the speed of the boat. On the other hand, the upper end of the tube 18 is open so that the cap 40 may be removed therefrom to enable a still larger volume of water to be delivered into the bait well. The threads on the outer diameter of the inner tube 18 frictionally resist removal of the cap 40 so that it will not be forced off during delivery of the water up through the inner tube 18.

Since operation of the device is apparent from the foregoing, a further description thereof is unnecessary. It will be noted, however, that each adjustment of the device may be made from the boat merely upon lifting the cover, and without removing the fitting from its attachment to the boat hull. Furthermore, this attachment requires at most that a single opening be drilled through the boat hull and, in fact, in might be found practical to use an existing hole.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for use in circulating water through a bait well of a boat, comprising an inner tube, an outer tube, a fitting on the lower ends of said tubes mounting the inner tube within the outer tube to provide a space therebetween, said outer tube having an opening in its upper end and said inner tube having an opening in its upper end leading exteriorly of the space and disposed above the opening in said outer tube, said fitting having a lateral inlet connecting with the lower end of the inner tube and an outlet connecting with the lower end of said space, said inlet and outlet being oppositely directed, and means for fixedly attaching said fitting and tubes to a boat hull with the tubes extending substantially upright within the bait well and the inlet facing forwardly of the boat beneath the hull.

2. A device for use in circulating water through a bait well of a boat, comprising an inner tube, an outer tube, a fitting on the lower ends of said tubes mounting the inner tube within the outer tube to provide a space therebetween, said outer tube having an opening in its upper end and said inner tube having an opening in its upper end leading exteriorly of the space, said fitting having a lateral inlet connecting with the lower end of the inner tube and an outlet connecting with the lower end of said space, said inlet and outlet being oppositely directed, and means for fixedly attaching said fitting and tubes to a boat hull with the tubes extending substantially upright within the bait well and the inlet facing forwardly of the boat beneath the hull, the lower end of said outer tube and a portion of said fitting being telescopically and slidably arranged for rotation relative to one another and provided with openings to the bait well adapted to be aligned and disaligned upon relative rotation therebetween.

3. A device for use in circulating water through a bait well of a boat, comprising an inner tube, an outer tube, a fitting on the lower ends of said tubes mounting the inner tube within the outer tube to provide a space therebetween, said outer tube having an opening in its upper end and said inner tube having an opening in its upper end leading exteriorly of the space, said fitting having a lateral inlet connecting with the lower end of the inner tube and an outlet connecting with the lower end of said space, said inlet and outlet being oppositely directed, and means for securing said fitting to a boat hull with the tubes extending substantially upright within the bait well and the inlet facing forwardly of the boat beneath the hull, the lower end of the outer tube being arranged slidably and telescopically of a portion of the fitting for removal therefrom upon movement longitudinally thereof.

4. A device of the character defined in claim 3, wherein said lower end of said outer tube is rotatable within the fitting portion, and the lower end and fitting are provided with openings to the bait well adapted to be aligned and disaligned upon relative rotation therebetween.

5. A device for use in circulating water through a bait well of a boat, comprising an inner tube, an outer tube, a fitting on the lower ends of said tubes mounting the inner tube within the outer tube to provide a space therebetween, said outer tube having an opening in its upper end and said inner tube having an opening in its upper end leading exteriorly of the space, said fitting having a lateral inlet connecting with the lower end of the inner tube and an outlet connecting with the lower end of said space, said inlet and outlet being oppositely directed, means for fixedly attaching said fitting and tubes to a boat hull with the tubes extending substantially upright within the bait well and the inlet facing forwardly of the boat beneath the hull, the opening from the inner tube comprising a lateral port therein, and a closure disposable over and movable longitudinally of the end of the inner tube for controlling the flow through said lateral port.

6. A device of the character defined in claim 1, wherein the upper end of the outer tube is closed and the inner tube extends through said closed end, and the opening in the outer tube comprises a lateral port therein.

7. A device for use in circulating water through a bait well of a boat, comprising an inner tube, an outer tube, a fitting on the lower ends of said tubes mounting the inner tube within the outer tube to provide a space therebetween, said outer tube having an opening in its upper end and said inner tube having an opening in its upper end leading exteriorly of the space, said fitting having a lateral inlet connecting with the lower end of the inner tube and an outlet connecting with the lower end of said space, said inlet and outlet being oppositely directed, means for fixedly attaching said fitting and tubes to a boat hull with the tubes extending substantially upright within the bait well and the inlet facing forwardly of the boat beneath the hull, and valve means on the end of the inner tube for regulating the size of the opening therefrom.

8. A device for use in circulating water through a bait well of a boat, comprising an outer tube having an opening in its upper end, an inner tube extending longitudinally within the outer tube to provide a space therebetween and having an opening in its upper end leading exteriorly of the space, a fitting on the lower end of the tubes having a lateral inlet connecting with the lower end of the inner tube and a lateral outlet connecting with the lower end of the space between the tubes and facing substantially oppositely to the lateral inlet, means about the fitting for fixedly attaching it within an opening through the hull of a boat to dispose the tubes substantially upright within the bait well and the inlet and outlet beneath the hull, the lower end of the outer tube being arranged slidably and telescopically of the fitting for removal therefrom upon longitudinal movement with respect thereto, there being an opening to the bait well in the lower end of the outer tube, means for covering and uncovering said last-mentioned opening, and valve means for regulating the size of the opening in the upper end of the inner tube.

References Cited in the file of this patent

UNITED STATES PATENTS

| 1,225,416 | De Khotinsky | May 8, 1917 |
| 1,669,276 | Baldwin | May 8, 1928 |
| 1,761,645 | Sobolew | June 3, 1930 |
| 2,169,941 | Campbell | Aug. 15, 1939 |
| 2,485,684 | Aldredge | Oct. 25, 1949 |
| 2,800,741 | Adams | June 30, 1957 |

FOREIGN PATENTS

| 142,258 | Australia | Feb. 15, 1935 |
| 68,398 | Sweden | May 11, 1928 |